Dec. 8, 1936.  A. R. THOMAS  2,063,353
REFRIGERATION
Filed Nov. 17, 1934   3 Sheets—Sheet 1

INVENTOR,
Albert R. Thomas
BY
his ATTORNEY

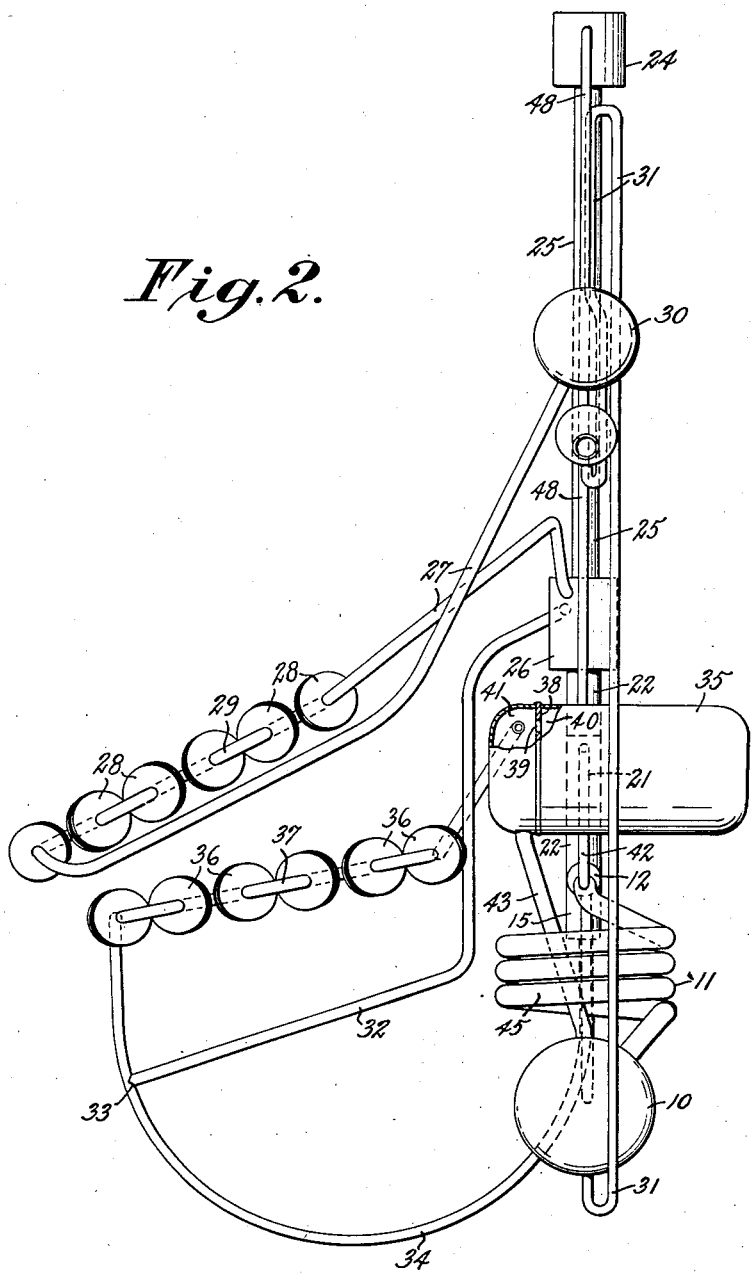

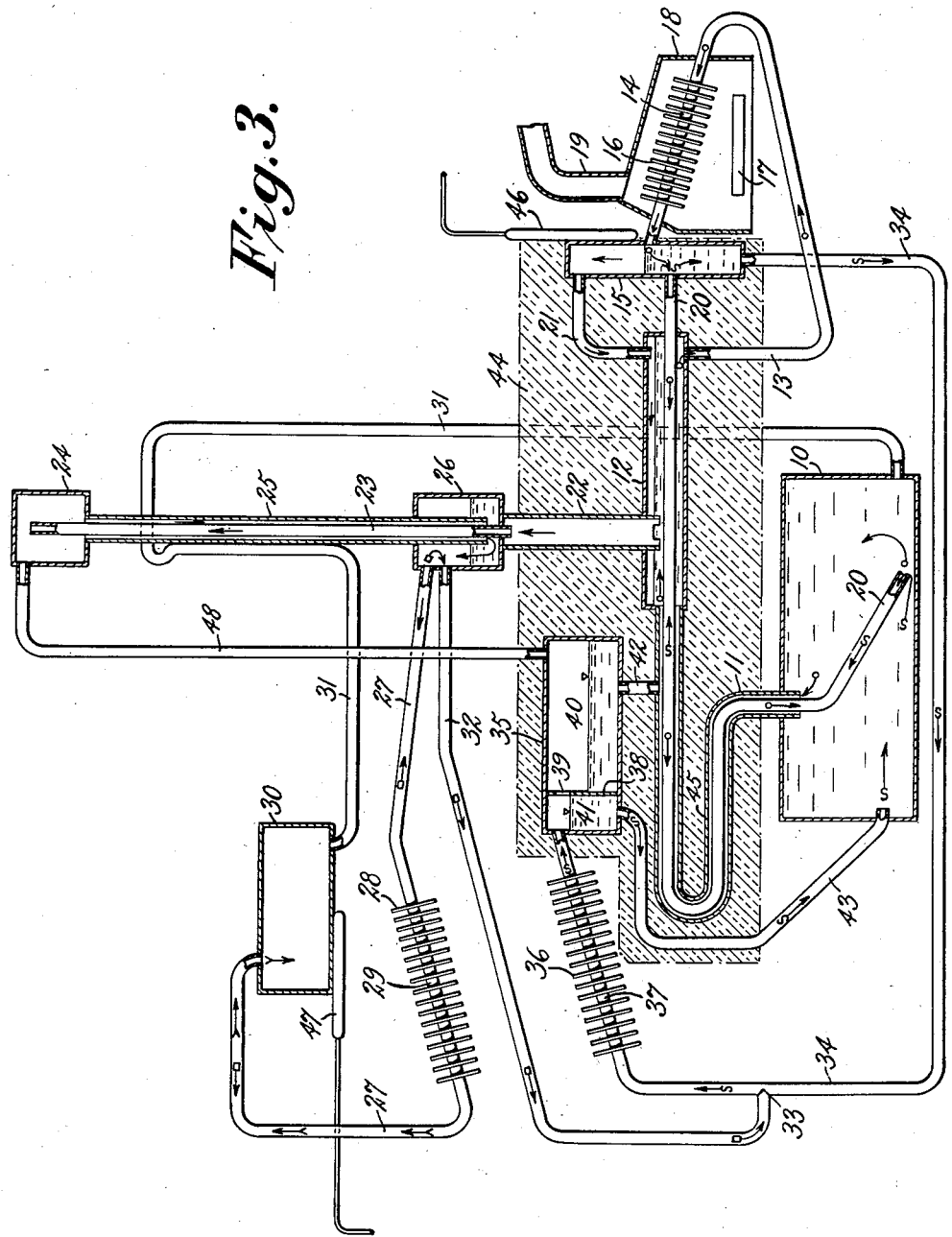

Patented Dec. 8, 1936

2,063,353

UNITED STATES PATENT OFFICE 2,063,353

REFRIGERATION

Albert R. Thomas, Evansville, Ind., assignor, by mesne assignments, to Servel, Inc., Dover, Del., a corporation of Delaware Application November 17, 1934, Serial No. 753,415

4 Claims. (Cl. 62—118)

My invention relates to refrigeration and more particularly to refrigerating systems of the type disclosed in application Serial No. 701,123 filed Dec. 6, 1933, now Patent No. 2,027,057, by Carl Georg Munters.

One object of the invention is to improve the start of absorption periods in an apparatus of the foregoing type in which the bulk of absorption liquid is maintained in cold condition during expulsion periods. I have found that if gas removed from the evaporator is introduced into cold solution it is absorbed too quickly particularly at the initial absorbing pressure, which is relatively high, to provide circulation due to thermosiphon action and a circulation of fresh absorption liquid through the volume variation vessel is necessary to accelerate the pressure drop. In order to overcome this I introduce the gas withdrawn from the evaporator into residual hot liquor left over from the previous expulsion period.

Other objects and the nature and advantages of my invention will be apparent from the following description considered in conjunction with the accompanying drawings forming a part of this specification, and of which:

Fig. 2 is a side view of the structure shown in Fig. 1; and

Fig. 3 is a diagram of the apparatus shown in Figs. 1 and 2.

Figure 1:
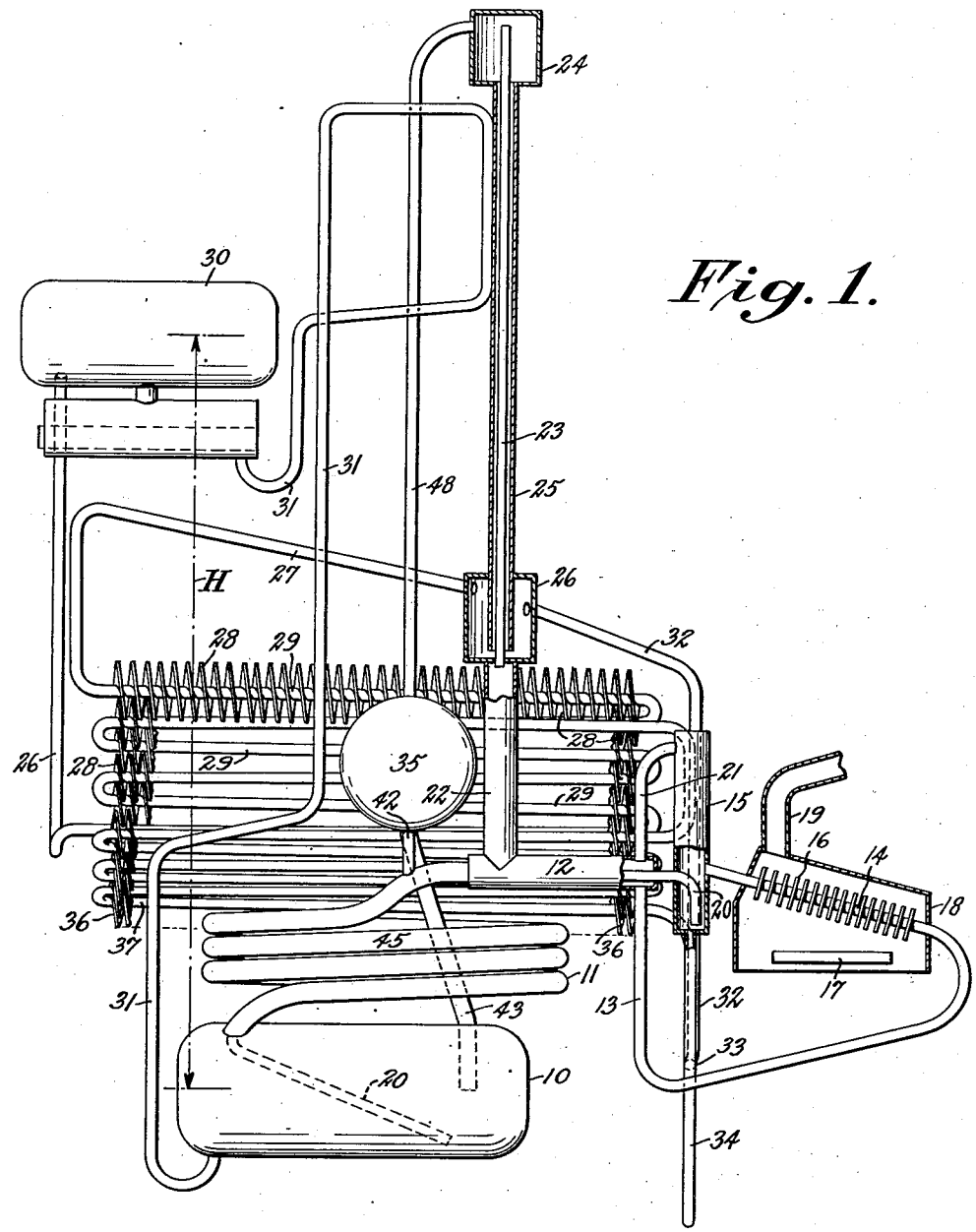
Fig. 1 is a front view of a system embodying the invention.

The system includes an absorption liquid storage reservoir 10. A conduit 11 is connected to the upper part of reservoir 10 and is connected to an analyzer vessel 12. A conduit 13 is connected to one end of analyzer 12 and extends downwardly and then upwardly to connect with a thermosiphon conduit 14 which is connected to a gas and liquid separation vessel 15. Thermosiphon pipe 14 is equipped with flanges 16 and is positioned above a heater 17 which may be a gas burner, an electric heating element, a kerosene burner, or other source of heat. The burner and thermosiphon conduit are surrounded by a hood 18 having an offtake 19. A conduit 20 is connected to vessel 15 and extends through analyzer vessel 12 and through conduit 11 and opens into the lower part of vessel 10.

A vapor conduit 21 is connected with the upper part of separating vessel 15 and with the analyzer vessel 12. A conduit 22 opens into analyzer vessel 12 and communicates at the top with a conduit 23 which extends upwardly to a vessel 24 and opens therein. A conduit 25 surrounds conduit 23, communicates at the top with vessel 24 and communicates at the bottom with a vessel 26. Vessel 26 is closed from conduit 22 and conduit 23 except as communication is afforded through conduit 25. A conduit 27 is connected to the upper part of chamber or vessel 26 and in part passes through fins 28 to form a condenser 29. Conduit 27 continues beyond the condenser to connect with the upper part of an evaporator 30. A drain conduit 31 is connected to the lower part of evaporator 30 and extends upwardly as shown and is in part in heat exchange relation with conduit 25. A conduit 32 connects chamber 26 with a point 33 in a conduit 34. Conduit 34 extends from the lower part of vessel 15 downwardly and then upwardly to connect with a volume variation vessel 35. Absorber fins 36 are provided on conduit 34 to form an absorber 37. Within the volume variation vessel is a partition 38 having an aperture 39 therein and forming chambers 40 and 41. Chamber 40 is connected by a pipe 42 with conduit 11. Chamber 41 is connected by means of a conduit 43 with reservoir 10. 44 represents insulation surrounding the volume variation vessel 35, the separating vessel 15, analyzer 12, and the major portion of conduits 11 and 20. Conduits 11 and 20 form a liquid heat exchanger 45. A thermostat bulb 46 in heat exchange with vessel 15 and a thermostat bulb 47 is in heat exchange with the evaporator 30. The evaporator 30 is so arranged as to take up heat from the body to be cooled. A conduit 48 is connected between chamber 24 and volume variation vessel 35.

The system contains a solution of ammonia or other suitable refrigerant in an absorption liquid such as water or other suitable liquid. In the actual apparatus shown in Figs. 1 and 2, the height H is equal to 22¾ inches from which the other dimensions can be determined. This apparatus was charged with 6 liters of ammonia solution of a concentration of 32 per cent.

I have operated the system shown in Figs. 1 and 2 with a control such as shown in application Serial No. 728,670 filed June 2, 1934 by S. W. E. Andersson.

In operation, heat is applied by means of the heater 17 and vapor is expelled from solution in the thermosiphon conduit 14. The vapor and liquid pass into the separation vessel 15. The gas expelled from solution passes through conduit 21 and into analyzer vessel 12. I have indicated the flow of ammonia vapor by arrows without tails. From vessel 12, the vapor passes through conduits 22 and 23 into vessel 24. Thence the ammonia vapor passes downwardly through conduit 25 bubbling through liquid in chamber 26 and through conduit 27 into the condenser 29. In the condenser the vapor is liquefied and the condensate passes through conduit 27 into the evaporator 30 where it accumulates. I have indicated the flow of condensed ammonia by arrows with a V tail.

The expulsion of vapor in conduit 14 also sets up a circulation of liquid between the member 14 and the absorption liquid reservoir 10 indicated by arrows with round tails as follows:

The liquid passes into the separating vessel 15 and thence through conduit 20 into reservoir 10. Liquid passes from the reservoir 10 through conduit 11 and through analyzer 12 and into conduit 13 and to member 14. This circulation is maintained due to the generation of vapor in member 14. The gas flowing through conduit 21 and analyzer 12 passes over the surface of liquid flowing to member 14. This serves to preheat the liquid passing to the heating member 14 and to cool and remove water vapor from the gas passing toward the condenser. The cold solution passing through conduit 11 is heated by the warm solution flowing in conduit 20 and therefore the absorption liquid entering the reservoir 10 is cooled. The reservoir 10 is preferably exposed to atmospheric cooling. As the expulsion period proceeds the liquid level or surface level in chamber 40 moves downwardly, this chamber supplying the liquid differential to take care of the gas driven off and accumulated in the evaporator 30.

When a sufficient amount of ammonia is driven out of solution, which is represented by a rise in temperature of bulb 46, the supply of heat is shut off and the low pressure evaporation or expulsion period then starts. Cooling of the hot section of the system causes condensation and some absorption takes place as a result of which the pressure in the gas space above the residual hot liquid is reduced relative to the pressure in the evaporator. This causes liquid to be drawn up in tube 25 and a liquid column is thus formed which provides a pressure differential for forcing gas from the evaporator into the absorption liquid. The gas flows from the evaporator through conduit 27 in the opposite direction to that previously described and is indicated by arrows with square tails. It flows through vessel 26 and into conduit 32, entering absorption liquid in pipe 34 at 33. This causes a flow of liquid induced by gas lift action which is indicated by arrows with S-shaped tails. This flow takes place upwardly in conduit 34 to absorber 37, thence through chamber 41 and downwardly through conduit 43 and into reservoir 10. In the absorber 37 the gas is absorbed by the liquid. From the reservoir 10, the liquid passes through conduit 20 and vessel 15 back to conduit 34. During the absorption periods, the liquid level stands at a higher level in vessels 15 and 22. Conduit 48 provides equalization of pressure between chamber 40 and vessel or conduit 22 and permits the liquid in chamber 40 to assist in lowering pressure at the beginning of absorption periods. Some of the liquid circulated during absorption periods flows through aperture 39 and the amount of liquid in chamber 40 increases as the absorption period progresses. It will be seen that the gas coming from the evaporator is introduced into liquid withdrawn from chamber 15 which contains residual hot liquid from the previous expulsion period. Due to the introduction of the gas into hot liquid, the gas is not so quickly dissolved and an appreciable column of gas and liquid is formed in one vertical leg of the absorption liquid circulation system thus facilitating this circulation.

I prefer to construct the boiler of the system in the form of a finned tube (thermosiphon conduit 14). I have found that this structure combines efficient heating and light weight. Preferably the tube is inclined from the horizontal at an angle less than 45°, for instance, about 20°.

It will be obvious that the invention can be applied to a variety of structures.

I claim:

1. In an absorption refrigeration system having low pressure periods of refrigerant evaporation and absorption alternating with higher pressure periods of vapor expulsion and condensation, a hot liquid section, a cold liquid section, conduits forming a first path of flow for liquid from the hot liquid section to the cold liquid section and a second path of flow from the cold liquid section to the hot liquid section, an evaporator, and means to conduct gas from the evaporator and introduce it into said first path.

2. In an absorption refrigeration system having low pressure periods of refrigerant evaporation alternating with higher pressure periods of vapor expulsion and condensation, an absorption liquid reservoir adapted to hold the bulk of absorption liquid in relatively cold state during expulsion periods, a hot liquid section, a conduit connecting said hot liquid section with said reservoir, an evaporator, and means to conduct vapor from the evaporator and introduce it into said conduit to cause flow of liquid from the hot liquid section to the reservoir.

3. In an absorption refrigeration system having low pressure periods of refrigerant evaporation alternating with higher pressure periods of vapor expulsion and condensation, a gas and liquid separation vessel, means to supply gas and liquid thereto during expulsion periods, an absorption liquid reservoir, a conduit connecting said separation vessel with said reservoir, an evaporator, and means to conduct gas from said evaporator and introduce it into said conduit.

4. In an absorption refrigeration system having low pressure periods of refrigerant evaporation alternating with higher pressure periods of vapor expulsion, the improvement which consists in storing the bulk of the absorption liquid in cold condition during expulsion periods, and introducing gas at the beginning of an evaporation period into hot residual liquor remaining from the previous expulsion period to cause circulation of liquid.

ALBERT R. THOMAS.